Patented Jan. 6, 1953

2,624,685

UNITED STATES PATENT OFFICE 2,624,685

TREATING BIRDS AND FEATHERS

Artemy A. Horvath, Princeton, N. J.

No Drawing. Application June 11, 1948,
Serial No. 32,542

8 Claims. (Cl. 117—142)

This invention relates to treatment of poultry and poultry feathers to assure good condition or tone.

Domestic fowls of today will illustrate the manifold ills that attend modern conditions of poultry production. Such birds demonstrate emphasis of the industry on higher productivity of eggs and of meat but show deterioration of feathering. This of itself is a poor result, for feathers of themselves are valuable; but inferior feathers are also symptoms of improper development of the birds. Poor plumage indicates inferior growth of fowls.

This invention is predicated on improving the lubrication of feathers and thus improving both the feathers and the bird that grows them. Lubricating the feathers of living birds according to this invention provides healthier conditions and appearance and contributes to vigor and development of the birds.

As illustration, water flowl with defective lubrication of the feathers show dull plumage. Ducks and geese, for example, may fail to have a smooth feather contour and may leave the water with feathers relatively wet. It has been reported that some waterfowl bred under modern conditions were even unable to swim because their feathers became wet and lost their buoyancy. Various other functions of the plumage, some yet unexplained by science, contribute to the well-being of the bird. These apply not only to waterfowl but to other birds as well. For example, where the feathers offer inadequate protection against moisture or cold, the bird has to combat greater loss of heat and requires additional calories in feed to compensate for the loss. Further exposition of this invention will illustrate various advantages of the treatment defined in the accompanying claims.

Many benefits of this invention result from applying to feathers various lipoids in which water is or can be incorporated as an internal colloidal phase.

For example, sterols in relatively fluid condition are suitable for treatment of the feathers. Sterols promote water-in-oil type of emulsion and such emulsions may be made in various ways known of themselves. A good sterol source is lanolin, though others also are suitable. These preferably are brought to fluid condition as for example by agitating with water. The resulting emulsion forms more readily and is of better quality if aided by addition of commercial lecithin, or preferably lecithin-rich fraction with lowered cephalin content from oleaginous seeds.

It is advantageous in this invention to incorporate also in the lanolin low-melting fat such as lard or as chicken fat, or non-drying oils such as castor oil, palm oil, cocoanut oil, cottonseed oil, peanut oil, soya oil, etc. Others of these types may be used, but these types both promote fluidity and suitable surfacing quality for the feather treatment and also develop other benefits to treated birds themselves. The lanolin, water and fat or oil may be emulsified in approximately equal proportions, in some cases aided by lecithin.

Another form of lanolin and water emulsion is more fluid, predominantly or entirely aqueous with oil correspondingly omitted. This is suitable for spraying or atomizing.

A third type of preparation suitable for this invention is of sterol, or lanolin, in solution. The solvent may be petroleum ether or may be hexane, or others, but preferred solvent is miscible with hot water, such as, acetone or ethyl alcohol, for example. The proportions are not critical since the solvent is volatile and evaporates.

Suitable preparations are not limited to lanolin, for cholesterol or dehydrocholesterol may be substituted partly or entirely for lanolin. Substitutes are those that promote water-in-oil type of emulsion. It is not intended to limit this invention to use of zoosterols put to include as well phytosterols comprising dehydrosterol types, which those in this art will now recognize.

Mode of application of the sterol to the feathers will depend on circumstances. A cloth or hand or other applicator carrying some of the heavier preparation may be stroked over the plumage of the bird, as from the head down over the back, but preferably in smooth strokes rather than by any rumpling or ruffling motions for a thin film will distribute itself into the feathers. Or, the thinner liquids may be sprayed or atomized over the feathers; again not necessarily extensively for the fluidized lipoid tends to distribute itself into the barbules of the feather.

This invention is not limited by theory but advantages of this feather treatment with lipids may be apparent from various observations.

A thin film of lipid becomes extended throughout the feather treated with these materials that promote water-in-oil type of emulsion. The tendency of the film to take in or to retain aqueous particles may of itself add to the film stability or may minimize the "air sensitiveness" of such films. In any event this film over the barbule surfaces tends to keep the barbules separate and to spread out or even fluff the feather. This better deployment adds to the appearance of the feather and it adds to the warmth or heat-insulating quality of the feather. The results persist even when the feather is subjected to water or to moist conditions.

More far-reaching are benefits to the fowl in its functional developments when its feathers have been treated with lipids that favor water-in-oil type of emulsion. Some of these benefits may be direct results of this treatment; others may be indirect. But included in these results is a desirably facile transpiration of moisture, so that body moisture and feather humidity conditions are improved. Another advantage is emphasized in the case of poultry reared under modern battery surroundings or also with hybrid birds bred especially for special features, for example for high egg production. Such birds require a pronounced calcium metabolism, at a rate that often shows deficiencies in the overall growth of the bird. For example, birds bred for egg capacity may show inferior bone growth; others may develop pulmonary weaknesses; others, general susceptibility to disease. It is found that applying a film of lipid to the feathers of the bird according to this invention in some way tones the bird to a more balanced level of health and growth and reduces such weaknesses as the examples just stated. It may be some of the film is absorbed by the bird, possibly in combination with improvement in general surface conditions. Regardless of the reason, this treatment results in greater vigor in the treated fowl and when young poults are so treated results in avoidance of stunted growth and in higher productivity of eggs and meat.

It will be clear that though this invention has particular merit when applied to the feathers of living birds, some of the advantages result when feathers are so treated, regardless of whether the feathers are on the bird or have been removed therefrom.

Suitable lipids include phosphatides and sterols, including without limitation cholesterol or dehydrocholesterol or isocholesterol or oxycholesterol. Wool fat, or lanolin, or soya oil and the like are suitable by themselves as well as in mixtures.

The principles of this invention and the best mode of application now contemplated have been described and distinguished in accordance with the patent statutes so that those skilled in the art may use the same, but other equivalent practices than those specifically illustrated are to be included within the scope of the appended claims.

What is claimed is:

1. In treating feathers of fowls to restore or improve their water-repellent qualities, the step comprising applying sterol to at least a portion of such feathers and permitting said sterol gradually to spread throughout the feather structure, thereby coating and improving the water-repellent qualities of said feathers.

2. In treating feathers of fowls to restore or improve their water-repellent qualities, the step comprising applying an emulsion of water in cholesterol to at least a portion of such feathers and permitting the emulsion gradually to spread throughout the feather structure, thereby coating and improving the water-repellent qualities of said feathers.

3. In treating feathers of fowls to restore or improve their water-repellent qualities, the step comprising applying an emulsion of water, cholesterol and phosphatide to at least a portion of such feathers and permitting the emulsion gradually to spread throughout the feather structure, thereby coating and improving the water-repellent qualities of said feathers.

4. In treating feathers of fowls to restore or improve their water-repellent qualities, the step comprising applying a lipid in volatile organic solvent to at least a portion of such feathers and permitting the emulsion gradually to spread throughout the feather structure, thereby coating and improving the water-repellent qualities of said feathers.

5. In treating feathers of fowls to restore or improve their water-repellent qualities, the step comprising applying by spraying a fluid emulsion of sterol and water to at least a portion of such feathers and permitting the emulsion gradually to spread throughout the feather structure, thereby coating and improving the water-repellent qualities of said feathers.

6. In treating feathers of fowls to restore or improve their water-repellent qualities, the step comprising applying by spraying a fluid of animal fat and non-drying vegetable oil to at least a portion of such feathers and permitting the fluid gradually to spread throughout the feather structure, thereby coating and improving the water-repellent qualities of said feathers.

7. In treating feathers of fowls to restore or improve their water-repellent qualities, the step comprising applying by spraying a fluid of animal fat and soya oil to at least a portion of such feathers and permitting the fluid gradually to spread throughout the feather structure, thereby coating and improving the water-repellent qualities of said feathers.

8. In treating feathers of fowls to restore or improve their water-repellent qualities, the step comprising applying by spraying a fluid of animal fat, phosphatide and water to at least a portion of such feathers and permitting the fluid gradually to spread throughout the feather structure, thereby coating and improving the water-repellent qualities of said feathers.

ARTEMY A. HORVATH.

REFERENCES CITED

The following references are of record in the file of this patent:

UNITED STATES PATENTS

| Number | Name | Date |
|---|---|---|
| 882,985 | Wilson | Mar. 24, 1908 |
| 987,433 | Crawford | Mar. 21, 1911 |
| 988,669 | Shuler | Apr. 4, 1911 |
| 1,095,471 | Sheldon | May 5, 1914 |
| 1,396,533 | Shaw | Nov. 8, 1921 |
| 1,576,046 | Guthrie | Mar. 9, 1926 |
| 1,696,460 | Teyen et al. | Dec. 25, 1928 |

FOREIGN PATENTS

| Number | Country | Date |
|---|---|---|
| 566,175 | Germany | Dec. 12, 1932 |

OTHER REFERENCES

Modern Cosmeticology by Ralph G. Harvy, 1940 edition, published by Chemical Publishing Co. of Brooklyn, N. Y., pages 67 to 77, inclusive.